US00RE48125E

(19) United States
(12) Reissued Patent
Plate

(10) Patent Number: US RE48,125 E
(45) Date of Reissued Patent: Jul. 28, 2020

(54) MAGAZINE AMMUNITION LOADER

(71) Applicant: PLATE, LLC, Fort Myers, FL (US)

(72) Inventor: Christopher Andrew Plate, Cape Coral, FL (US)

(73) Assignee: Plate LLC, Cape Coral, FL (US)

(21) Appl. No.: 16/653,727

(22) Filed: Oct. 15, 2019

Related U.S. Patent Documents

Reissue of:
(64) Patent No.: 10,151,547
Issued: Dec. 11, 2018
Appl. No.: 15/984,328
Filed: May 19, 2018

U.S. Applications:
(63) Continuation of application No. 15/897,336, filed on Feb. 15, 2018, now Pat. No. 10,598,455, which is a continuation of application No. 15/713,395, filed on Sep. 22, 2017, now Pat. No. 9,933,220, which is a continuation of application No. 15/598,707, filed on May 18, 2017, now Pat. No. 9,797,669, which is a continuation of application No. 15/294,770, filed on Oct. 16, 2016, now Pat. No. 9,689,633, which is a continuation-in-part of application No. 14/979,051, filed on Dec. 22, 2015, now Pat. No. 9,618,286,
(Continued)

(51) Int. Cl.
*F41A 9/82* (2006.01)
*F41A 9/83* (2006.01)

(52) U.S. Cl.
CPC ..... *F41A 9/83* (2013.01)

(58) Field of Classification Search
CPC ..... F41A 9/83
See application file for complete search history.

(56) References Cited

U.S. PATENT DOCUMENTS 447,577 A 3/1891 Milanovitch-Koka
581,296 A 4/1897 Von Mannlicher
(Continued)

FOREIGN PATENT DOCUMENTS

DE 3016836 A1 2/1980
DE 3634119 A1 4/1988
EP 0205661 A2 12/1986

OTHER PUBLICATIONS

Unknown Author, AR-15/ M4 Magazine Loader, Mar. 13, 2014 or earlier, MrLarry0001, https://www.youtube.com/watch?v=AnUk1aNp1PE.

(Continued)

*Primary Examiner* — Jeffrey R Jastrzab
(74) *Attorney, Agent, or Firm* — George F. Wallace

(57) ABSTRACT

A magazine loader include a main body, a rounds abutment, and a rounds cavity in communication with a magazine cavity. A plurality of rounds are provided to the rounds cavity and are moveable along a movement plane abuttingly defined by first and second rounds cavity sides, at least one upper cavity abutment, and at least one lower cavity abutment. With a magazine positioned within the magazine cavity, as rounds are slidably moved towards the magazine cavity, pivot points of each round successively abuts a downwardly angled portion of the second rounds cavity side and pivots to angle a second round end of each round towards the magazine, so that each round successively enters the magazine.

36 Claims, 11 Drawing Sheets

Related U.S. Application Data which is a continuation-in-part of application No. 14/869,502, filed on Sep. 29, 2015, now abandoned.

(60) Provisional application No. 62/473,994, filed on Mar. 20, 2017, provisional application No. 62/478,090, filed on Mar. 29, 2017.

(56) References Cited

U.S. PATENT DOCUMENTS

| | | | | |
|---|---|---|---|---|
| 2,403,012 | A * | 7/1946 | McPheters | F41A 9/83 42/87 |
| 4,352,254 | A * | 10/1982 | Peter | F41A 9/84 42/88 |
| 4,392,321 | A | 7/1983 | Bosworth | |
| 4,509,284 | A | 4/1985 | Naber | |
| 4,538,371 | A | 9/1985 | Howard | |
| 4,570,371 | A | 2/1986 | Mears | |
| 4,574,511 | A | 3/1986 | Csongor | |
| 4,632,011 | A | 12/1986 | Metz et al. | |
| 4,690,031 | A | 9/1987 | Metz et al. | |
| 4,706,402 | A * | 11/1987 | Csongor | F41A 9/84 42/87 |
| 4,736,667 | A | 4/1988 | Kochevar et al. | |
| 4,739,572 | A | 4/1988 | Brandenburg | |
| 4,756,110 | A | 7/1988 | Beltron | |
| 4,879,829 | A | 11/1989 | Miller et al. | |
| 4,905,394 | A | 3/1990 | Predazzer | |
| 4,939,862 | A | 7/1990 | Brandenburg et al. | |
| 4,967,723 | A | 11/1990 | Cutrell | |
| 5,319,872 | A | 6/1994 | Bammate | |
| 5,402,594 | A | 4/1995 | Switzer | |
| 6,754,987 | B1 | 6/2004 | Cheng et al. | |
| 6,810,616 | B2 | 11/2004 | Tal et al. | |
| 6,817,133 | B1 | 11/2004 | Williams | |
| 7,059,077 | B2 | 6/2006 | Tal et al. | |
| 7,257,919 | B1 | 8/2007 | Farley | |
| 7,383,657 | B2 | 6/2008 | Pikielny | |
| 7,487,613 | B2 | 2/2009 | Taylor | |
| 7,503,138 | B2 | 3/2009 | Tal et al. | |
| 7,637,048 | B2 | 12/2009 | Tal et al. | |
| 7,805,874 | B2 | 10/2010 | Tal et al. | |
| 7,866,080 | B2 | 1/2011 | Tucker | |
| 8,356,441 | B2 | 1/2013 | Meinel | |
| 8,453,366 | B2 | 6/2013 | Gray | |
| 8,469,014 | B2 | 6/2013 | Hu | |
| 8,650,792 | B1 | 2/2014 | Overmars | |
| 8,915,007 | B1 | 12/2014 | Williams | |
| 8,931,199 | B1 | 1/2015 | Cauley, Jr. et al. | |
| D728,065 | S | 4/2015 | Tal et al. | |
| 9,003,687 | B2 | 4/2015 | Cauley, Jr. et al. | |
| 9,057,570 | B1 | 6/2015 | Tal et al. | |
| 9,212,859 | B1 | 12/2015 | Tal et al. | |
| 10,254,061 | B1 | 4/2019 | Loveday, IV et al. | |
| 10,317,154 | B1 | 6/2019 | Loveday, IV et al. | |
| 10,612,873 | B1 * | 4/2020 | Witecha | F41A 9/83 |
| 2003/0046854 | A1 | 3/2003 | Urchek | |
| 2004/0020096 | A1 | 2/2004 | Tal et al. | |
| 2004/0159035 | A1 * | 8/2004 | Newman | F41A 9/83 42/87 |
| 2005/0081421 | A1 | 4/2005 | Guy et al. | |
| 2007/0017140 | A1 | 1/2007 | Pikeilny | |
| 2007/0107291 | A1 | 5/2007 | Tal et al. | |
| 2008/0184608 | A1 | 8/2008 | Tal et al. | |
| 2008/0184698 | A1 | 8/2008 | Tal et al. | |
| 2008/0244952 | A1 | 10/2008 | Taylor | |
| 2009/0044440 | A1 | 2/2009 | Tal et al. | |
| 2010/0175294 | A1 | 7/2010 | Meinel | |
| 2010/0313460 | A1 | 12/2010 | Tucker | |
| 2012/0060810 | A1 | 3/2012 | Hu | |
| 2013/0067788 | A1 | 3/2013 | Gray | |
| 2013/0192117 | A1 | 8/2013 | Meinel | |
| 2013/0232843 | A1 | 9/2013 | Bajuelo | |
| 2014/0033592 | A1 | 2/2014 | Fiorucci | |
| 2014/0298704 | A1 | 10/2014 | Niccum | |
| 2014/0311008 | A1 | 10/2014 | McPhee | |
| 2014/0317985 | A1 | 10/2014 | Cauley, Jr. et al. | |
| 2015/0007480 | A1 | 1/2015 | Cauley, Jr. et al. | |
| 2015/0027023 | A1 | 1/2015 | Michael et al. | |
| 2015/0219415 | A1 | 8/2015 | Cauley, Jr. et al. | |
| 2015/0377573 | A1 | 12/2015 | Niccum | |
| 2016/0025437 | A1 * | 1/2016 | Slocum | F41A 9/83 42/87 |
| 2017/0051991 | A1 * | 2/2017 | Cottrell | F41A 9/83 |
| 2017/0051992 | A1 * | 2/2017 | Cottrell | F41A 9/83 |

OTHER PUBLICATIONS

Unknown Author, AR Magazine speed loader, Mar. 29, 2015 or earlier, Double.sub.--MK, https://www.youtube.com/watch?v=vf76iM1E3fk.

Unknown Author, Podavach Multi-Caliber Magazine Loader, Mar. 27, 2016 or earlier, Podavach, http://podavach.com/.

Glockmeister, "Exploded Glock Drawing"—Glockmeister, Master of Perfection, Apr. 17, 2015, https://web.archive.org/web/20150417034813/http://www.glockmeister.com/Ex- plodedGlockDrawing.asp.

Unknown Author, Shop MagPacker Magazine Speed Loaders, Aug. 28, 2015 or earlier, https://www.magpacker.com/MagPacker-AR-15-AK-47-Magazine-Speed-L- oaders/c/1.

Unknown Author, Range Benchloader, Sep. 29, 2015 or earlier, Maglula Ltd., Israel.

Unknown Author, Thunderstruck Loaders, Jan. 4, 2016 or earlier, H & K Enterprises, Inc., http://thunderstruckloaders.com/.

Unknown Author, Lula, Jan. 4, 2016 or earlier, Maglula Ltd., http://www.maglula.com/product-category/rifle-mag-loaders/lula/.

Unknown Author, Smitload, Apr. 5, 2016 or earlier, Smithshot, http://www.smitshot.com/.

Unknown Author, McFadden Ultimate Clip Loader, Jun. 16, 2011 or earlier, Jarrett Maxwell, https://www.youtube.com/watch?v=nNPWFf5k8Qw.

Unknown Author, Lightnin' Grip Loader, Mar. 3, 2014 or earlier, McFadden Machine, https://www.youtube.com/watch?v=ZxLiUaGZnbw.

Unknown Author, Magazine Loaders for B&T MP9 and HK MP5, Sep. 3, 2015 or earlier, Александр Сергеевич , https://www.youtube.com/watch?v=himrMwJ7gn8.

Unknown Author, Podavach Loading vs. Manual Loading, Sep. 25, 2015 or earlier, U-Loader by Podavach: , AR15 & AK Speed Loader, https://www.youtube.com/watch?v=f5UhR0QZu38.

Unknown Author, Podavach U-Loader Version 3.0 AR-15 & AK Magazine Speed Loader Review, Jan. 17, 2016 or earlier, U-Loader by Podavach: AR15 & AK Speed Loader, https://www.youtube.com/watch?v=Qmbb4r9g9Sg.

Unknown Author, Multi-caliber AK, AR-15 Magazine Speed Loader—Podavach Version 5.4, Feb. 20, 2016 or earlier, U-Loader by Podavach: AR15 & AK Speed Loader, https://www.youtube.com/watch?v=IrTmkNJmuXo.

Unknown Author, U-Loader by Podavach: Podavach Version 5.4—Multi-Platform Magazine Speed Loader for AK & AR15, Mar. 20, 2016 or earlier, U-Loader by Podavach: AR15 & AK Speed Loader, https://www.youtube.com/watch?v=-UROVSuPfHs.

Unknown Author, Podavach Mag loader v5.4, Apr. 1, 2016 or earlier, darink300zx, https://www.youtube.com/watch?v=_zw4iTiuv1s.

Ray I, SmitLoad Glock Mag Loader, Apr. 21, 2016 or earlier, The Firearm Blog, https://www.thefirearmblog.com/blog/2016/04/211225273/.

Unknown Author, SmitShot has a brand new speed loader!! Available for Glock 9mm soon. Keep posted for all other upcoming models!, Sep. 14, 2016, or earlier, Instagram, https://www.instagram.com/p/BKW2gjmgn4d/.

Unknown Author, How a Mannlicher M1905 works, Nov. 19, 2017, or earlier, Si vis pacem , para bellum., https://www.youtube.com/watch?v=Ob820VDgPQE.

(56) References Cited

OTHER PUBLICATIONS

Unknown Author, Small Arms of WWI Primer 026: Austro-Hungarian Roth-Kmka M.7 Pistol, May 24, 2016, or earlier, C&Rsenal., https://www.youtube.com/watch?v=MQTexxPSszU.
Unknown Author, Strip Lula. Can Loading AR Mags be Easier Than This?, Jun. 27, 2014, or earlier, beelikestowatch, https://www.youtube.com/watch?v=5zTUdk4ZF8Y.
Defendant's Answer, Defenses, and Counterclaims to Plaintiff's Amended Complaint; *Plate, LLC* v. *Rctenn, LLC*, United States District Court Middle District of Tennessee, Case No. 3:18-cv-806; Feb. 19, 2019.
Defendants' Answer, Defenses, and Counterclaims to Re-Filed Fourth Amended Complaint; *Plate, LLC and Christopher Plate* v. *Elite Tactical Systems, LLC, et al.*, United States District Court Eastern District of Tennessee, Case No. 3:18-cv-265; Sep. 17, 2019.
Defendant's Memorandum in Support of Motion for Summary Judgment; *Plate, LLC* v. *Rctenn, LLC*, United States District Court Middle District of Tennessee, Case No. 3:18-cv-806; Jan. 17, 2020.
Defendant's Reply Brief in Support of Motion of Summary Judgment; *Plate, LLC* v. *Rctenn, LLC*, United States District Court Middle District of Tennessee, Case No. 3:18-cv-806; Feb. 28, 2020.
Motion to Continue Hearing; *Plate, LLC and Christopher Plate* v. *Elite Tactical Systems, LLC, et al.*, United States District Court Eastern District of Tennessee, Case No. 3:18-cv-265; Jul. 12, 2018.
Response to Plaintiffs Motion for a Preliminary Injunction; *Plate, LLC and Christopher Plate* v. *Elite Tactical Systems, LLC, et al.*, United States District Court Eastern District of Tennessee, Case No. 3:18-cv-265; Jul. 20, 2018.
Defendants' Answer, Defenses, and Counterclaims to Second Amended Complaint; *Plate, LLC and Christopher Plate* v. *Elite Tactical Systems, LLC, et al.*, United States District Court Eastern District of Tennessee, Case No. 3:18-cv-265; Aug. 30, 2018.
Defendants' First Amended Answer, Defenses, and Counterclaims to Second Amended Complaint; *Plate, LLC and Christopher Plate* v. *Elite Tactical Systems, LLC, et al.*, United States District Court Eastern District of Tennessee, Case No. 3:18-cv-265; Sep. 20, 2018.
Defendants' Answer, Defenses, and Counterclaims to Third Amended Complaint; *Plate, LLC and Christopher Plate* v. *Elite Tactical Systems, LLC, et al.*, United States District Court Eastern District of Tennessee, Case No. 3:18-cv-265; Feb. 13, 2019.
Defendants' Amended Answer, Defenses, and Counterclaims to Third Amended Complaint; *Plate, LLC and Christopher Plate* v. *Elite Tactical Systems, LLC, et al.*, United States District Court Eastern District of Tennessee, Case No. 3:18-cv-265; Mar. 6, 2019.
Defendants' Opening Claim Construction Brief; *Plate, LLC and Christopher Plate* v. *Elite Tactical Systems, LLC, et al.*, United States District Court Eastern District of Tennessee, Case No. 3:18-cv-265; *Plate, LLC* v. *Rctenn, LLC*, United States District Court Middle District of Tennessee, Case No. 3:18-cv-806; Apr. 5, 2019.
Defendants' Responsive Claim Construction Brief; *Plate, LLC and Christopher Plate* v. *Elite Tactical Systems, LLC, et al.*, United States District Court Eastern District of Tennessee, Case No. 3:18-cv-265; *Plate, LLC* v. *Rctenn, LLC*, United States District Court Middle District of Tennessee, Case No. 3:18-cv-806; May 3, 2019.
Defendants' Response to Plaintiff's Rule 15 Motion for Leave to File Fourth Amended Complaint; *Plate, LLC and Christopher Plate* v. *Elite Tactical Systems, LLC, et al.*, United States District Court Eastern District of Tennessee, Case No. 3:18-cv-265; Jul. 15, 2019.
Motion; *Plate, LLC and Christopher Plate* v. *Elite Tactical Systems, LLC, et al.*, United States District Court Eastern District of Tennessee, Case No. 3:18-cv-265; Jul. 25, 2019.
Defendants' Answer, Defenses, and Counterclaims to Fourth Amended Complaint *Plate, LLC and Christopher Plate* v. *Elite Tactical Systems, LLC, et al.*, United States District Court Eastern District of Tennessee, Case No. 3:18-cv-265; Aug. 15, 2019.
Defendants' Response to Plaintiffs' Motion to Compel; *Plate, LLC and Christopher Plate* v. *Elite Tactical Systems, LLC, at al.*, United States District Court Eastern District of Tennessee, Case No. 3:18-cv-265; Jan. 17, 2020.
Response to Plaintiffs' Motion to Exclude Derek Watkins; *Plate, LLC and Christopher Plate* v. *Elite Tactical Systems, LLC, et al.*, United States District Court Eastern District of Tennessee, Case No. 3:18-cv-265; Jan. 24, 2020.
Defendants' Response to Plaintiffs' Motion for Limited Purpose Extension to Pleading Amendment Deadline; *Plate, LLC and Christopher Plate* v. *Elite Tactical Systems, LLC, et al.*, United States District Court Eastern District of Tennessee, Case No. 3:18-cv-265; Mar. 12, 2020.
Defendants' Response in Opposition to Plaintiffs' Rule 15 Motion for Leave to File Fifth Amended Complaint; *Plate, LLC and Christopher Plate* v. *Elite Tactical Systems, LLC, et al.*, United States District Court Eastern District of Tennessee, Case No. 3:18-cv-265; Apr. 28, 2020.
Defendants' Motion to Continue Claim Construction Proceedings and to Stay the Case; *Plate, LLC and Christopher Plate* v. *Elite Tactical Systems, LLC, et al.*, United States District Court Eastern District of Tennessee, Case No. 3:18-cv-265; Apr. 28, 2020.
Defendant's Answer, Defenses, and Counterclaims to Plaintiffs Complaint; *Plate, LLC* v. *Rctenn, LLC*, United States District Court Middle District of Tennessee, Case No. 3:18-cv-806; Sep. 27, 2018.
Defendant's Motion to Stay; *Plate, LLC* v. *Rctenn, LLC*, United States District Court Middle District of Tennessee, Case No. 3:18-cv-806; Oct. 5, 2018.
Defendant's Memorandum in Support of Motion to Stay; *Plate, LLC* v. *Rctenn, LLC*, United States District Court Middle District of Tennessee, Case No. 3:18-cv-806; Oct. 5, 2018.
Defendant's Reply Brief in Support of its Motion to Stay; *Plate, LLC* v. *Rctenn, LLC*, United States District Court Middle District of Tennessee, Case No. 3:18-cv-806; Nov. 16, 2018.
Amended Certificate of Service; *Plate, LLC* v. *Rctenn, LLC*, United States District Court Middle District of Tennessee, Case No. 3:18-cv-806; Feb. 21, 2019.
Defendant's Motion for Leave to File Summary Judgement Briefs in Excess Page Limits Under Local Rules; *Plate, LLC* v. *Rctenn, LLC*, United States District Court Middle District of Tennessee, Case No. 3:18-cv-806; Jan. 3, 2020.
Motion for Leave to File Under Seal; *Plate, LLC* v. *Rctenn, LLC*, United States District Court Middle District of Tennessee, Case No. 3:18-cv-806; Jan. 10, 2020.
Motion to Exclude Expert Opinion Testimony of Dr. Grune; *Plate, LLC* v. *Rctenn, LLC*, United States District Court Middle District of Tennessee, Case No. 3:18-cv-806; Jan. 10, 2020.
Memorandum in Support of Motion to Exclude Expert Opinion Testimony of Dr. Grune; *Plate, LLC* v. *Rctenn, LLC*, United States District Court Middle District of Tennessee, Case No. 3:18-cv-806; Jan. 10, 2020.
Defendant's Motion for Summary Judgment; *Plate, LLC* v. *Rctenn, LLC*, United States District Court Middle District of Tennessee, Case No. 3:18-cv-806; Jan. 17, 2020.
Defendant's Statement of Undisputed Material Facts in Support of Motion for Summary Judgment; *Plate, LLC* v. *Rctenn, LLC*, United States District Court Middle District of Tennessee, Case No. 3:18-cv-806; Jan. 17, 2020.
Defendant's Unopposed Motion for Leave to File Reply Brief with Excess Pages; *Plate, LLC* v. *Rctenn, LLC*, United States District Court Middle District of Tennessee, Case No. 3:18-cv-806; Jan. 29, 2020.
Defendant's Reply in Support of Motion to Exclude Expert Opinion Testimony of Dr. Guerry Grune; *Plate, LLC* v. *Rctenn, LLC*, United States District Court Middle District of Tennessee, Case No. 3:18-cv-806; Jan. 31, 2020.
Defendant's Response in Opposition to Plaintiff's Motion for Partial Summary Judgment; *Plate, LLC* v. *Rctenn, LLC*, United States District Court Middle District of Tennessee, Case No. 3:18-cv-806; Feb. 14, 2020.
Defendant's Response to Plaintiff's Statement of Undisputed Material Facts; *Plate, LLC* v. *Rctenn, LLC*, United States District Court Middle District of Tennessee, Case No. 3:18-cv-806; Feb. 14, 2020.

(56) References Cited

OTHER PUBLICATIONS

Defendant's Reply Statement of Undisputed Material Facts in Support of Motion for Summary Judgment; *Plate, LLC* v. *Rctenn, LLC*, United States District Court Middle District of Tennessee, Case No. 3:18-cv-806; Feb. 28, 2020.

Defendant's Motion for Leave to File Supplemental Brief in Support of Motion for Summary Judgment; *Plate, LLC* v. *Rctenn, LLC*, United States District Court Middle District of Tennessee, Case No. 3:18-cv-806; Apr. 22, 2020.

Defendant's Response to Plaintiff's Emergency Motion to Dissolve Protective Order and Unseal All Filings; *Plate, LLC* v. *Rctenn, LLC*, United States District Court Middle District of Tennessee, Case No. 3:18-cv-806; Jun. 3, 2020.

Unknown Author, Magazine Loaders for B&T MP9 and HK MP5, Sep. 3, 2015, Александр Сергеевич , https://www.youtube.com/watch?v=himrMwJ7gn8.

Unknown Author, So the cats out of the bag., Dec. 23, 2016, etsgroup, https://www.instagram.com/p/BOXrixQjfBT/.

Unknown Author, Custom AR-15 Magazine Loader Mar. 27, 2016, Buck Shot Sporting Goods, https://gun.deals/product/custom-ar-15-magazine-loader-wooden-cnc-usa-made-free-ship-no-cc-fee-150.

Unknown Author, AR-15, 30 Round Magazine Speed Loader, Nov. 26, 2015, PopsCabinetShop, https://www.etsy.com/listing/239467167/ar-15-30-round-magazine-speed-loader?ref=shop-home-active-3.

Unknown Author, AR .223/5.56 speed loader, Mar. 27, 2016, 903plasmaworksdotcom, https://www.etsy.com/listing/286400047/ar-223556-speed-loader?ref=market.

Unknown Author, AR-15 Mag loader, Mar. 27, 2016, JarednCece, https://www.elsy.com/listing/265952088/ar-15-mag-loader?ref=shop-review.

Unknown Author, AR 15 Magazine Speed Loader !!Free Shipping!!, Mar. 27, 2016, RedRockSignworks, https://www.etsy.com/listing/271664006/ar-15-magazine-speed-loader-free?ga-order=most-relevant&ga-search-type=all&ga-view-type=gallery&ga-search-query=ar15%20mag%20loader&ref=sr-gallery-4.

Unknown Author, Handcrafted AR15 Mag loader, Mar. 27, 2016, MountainViewWoodshop, https://www.etsy.com/listing/265031238/handcrafted-ar15-mag-loader-summer?utm-source=google&utm-medium=cpc&utm-campaign=shopping-us-branded-toys-and-games&utm-custom1=249b116d-2059-4def-a8a8-0eacd6db60d6&gclid=CICc3-CK4csCFcokhgodSmEGLQ.

Unknown Author, (Patent Pending) Mag-Packer, AR15 model, Jul. 13, 2015, Mag Packer, https://www.youtube.com/watch?v=0JCholTsm90.

Office Action dated Jan. 6, 2015 in U.S. Appl. No. 13/931,953.

* cited by examiner

MAGAZINE AMMUNITION LOADER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED DOCUMENTS

This application is related to, incorporates in its entirety, and claims the priority benefit of co-pending U.S. patent application Ser. No. 15/897,336 filed on Feb. 15, 2018, which incorporated in their entireties and claimed the priority benefit of the following: U.S. Provisional Patent Application Ser. Nos. 62/473,994 and 62/478,090 filed on Mar. 20, 2017 and Mar. 29, 2017, respectively, and U.S. patent application Ser. No. 15/713,395, now U.S. Pat. No. [9,993,220] *9,933,220*, entitled "Magazine Loader," and filed on Sep. 22, 2017 by Christopher Andrew Plate, which incorporated by reference and claimed the priority benefit of U.S. patent application Ser. No. 15/598,707, entitled Magazine Loader," and filed on May 18, 2017 by Christopher Andrew Plate, which incorporated by reference and claimed the priority benefit of U.S. patent application Ser. No. 15/294,770, now U.S. Pat. No. 9,689,633, which incorporated by reference and claimed the priority benefit of U.S. patent application Ser. No. 14/979,051, now U.S. Pat. No. 9,618,286, which incorporated by reference and claimed the priority benefit of U.S. patent application Ser. No. 14/869,502, now abandoned.

FIELD OF THE INVENTION

The present invention relates to ammunition magazines, and more specifically, to magazines loaders.

BACKGROUND OF THE INVENTION

A ammunition magazine is a device used to sequentially provide rounds of ammunition to a firearm. A magazine loader is a device that facilitates the loading of rounds into an ammunition magazine.

SUMMARY OF THE INVENTION

It is an object of the present invention to provide a magazine loader and a method of using the same.

It is another object of the present invention to provide a magazine loader, and method of using the same, that overcomes at least one deficiency in the prior art.

The present invention provides a magazine loader, and method of using the same, configured to load a plurality of ammunition rounds into a magazine having a magazine shape, with each round respectively including first and second round ends and a pivot point, with the magazine loader having a main body, a rounds cavity, a magazine cavity, and a rounds abutment.

In an exemplary embodiment of the present invention, a main body can include a first main body end, a second main body end, and a main body length.

In exemplary aspects, a rounds cavity can be formed within the main body, and can have a first rounds cavity end in communication with a magazine cavity and a second rounds cavity end positioned at the second main body end.

Further, the rounds cavity can be defined by first and second rounds cavity sides, at least one upper cavity abutment, and at least one lower cavity abutment, with the rounds cavity sides, the at least one upper cavity abutment, and the at least one lower cavity abutment being positioned to abuttingly limit movement of rounds along a movement plane as the rounds exit the rounds cavity, and at least a portion of the rounds cavity being shaped to accept the round into the rounds cavity.

In another exemplary aspect, a magazine cavity can be formed within the main body, can be positioned at the first main body end, and can be complementarily shaped to the magazine shape to retain the magazine in a fixed position within the magazine cavity.

In still another exemplary aspect, a rounds abutment can be at least partially positioned within the rounds cavity at the first rounds cavity end.

In further exemplary aspects, a magazine can be positioned within the magazine cavity and as a plurality of rounds slidably move out of the rounds cavity, the pivot point of each round can successively contact the rounds abutment to angle the second case end of each respective round towards the magazine cavity, and when an exiting round exits the rounds cavity, the exiting round can abut and force at least one of a follower and a pre-loaded round in the magazine downwardly into the magazine against the spring force as the exiting round enters the magazine.

In another exemplary embodiment of the present invention, a method of using an ammunition magazine loader to load a plurality of ammunition rounds into an ammunition magazine can include the following steps: positioning the magazine within the magazine cavity; introducing the rounds into a rounds cavity; and with a structure, pushing the rounds, via a last round, towards and into the magazine, such that as the rounds are moved towards the magazine, a pivot point of each round can successively contact a rounds abutment to angle a particular rounds end of each successive round towards the magazine, and when an exiting round exits the rounds cavity, the exiting round can abut and force at least one of a follower and a pre-loaded round in the magazine into the magazine against a spring force as the exiting round enters the magazine.

Any combination of one of more of the following are additional optional exemplary aspects of the present invention: an upper cavity abutment can include one or more ledges; a lower cavity abutment can include at least one of a magazine retention depression and a magazine retention protrusion; a lower cavity abutment can be provided as a rounds cavity floor; a rounds cavity floor can include at least one of a magazine retention depression and a magazine retention protrusion; a magazine loader can further comprise a rounds retention cavity in communication with the rounds cavity; a first rounds cavity side can includes a curved shape that provides the rounds abutment; and the loader can further comprise a magazine cavity cover that covers at least a portion of at least one of the magazine cavity and/or the rounds cavity.

Any combination of one of more of the following are further additional optional exemplary aspects of the present invention: the first rounds cavity side can include a downwardly angled portion that provides the rounds abutment; the downwardly angled portion can include a linear, convex, concave, or other functionally compatible shape; the second rounds cavity side can include a first downwardly angled portion and the first rounds cavity side can include a second downwardly angled portion that provides the rounds abutment, and as at least one round is moved towards the magazine, the second rounds end of each round can successively pass over the first downwardly angled portion; the first downwardly angled portion can include a linear, convex, concave, or other functionally compatible shape; the second rounds cavity side can include a third downwardly angled portion positioned between the first downwardly angled portion and the second main body end; the loader can further comprise a magazine cavity cover that covers at least a portion of the magazine cavity and/or the rounds cavity.

These and other exemplary aspects and embodiments of the present invention are further described herein.

DETAILED DESCRIPTION

Figure 1A:
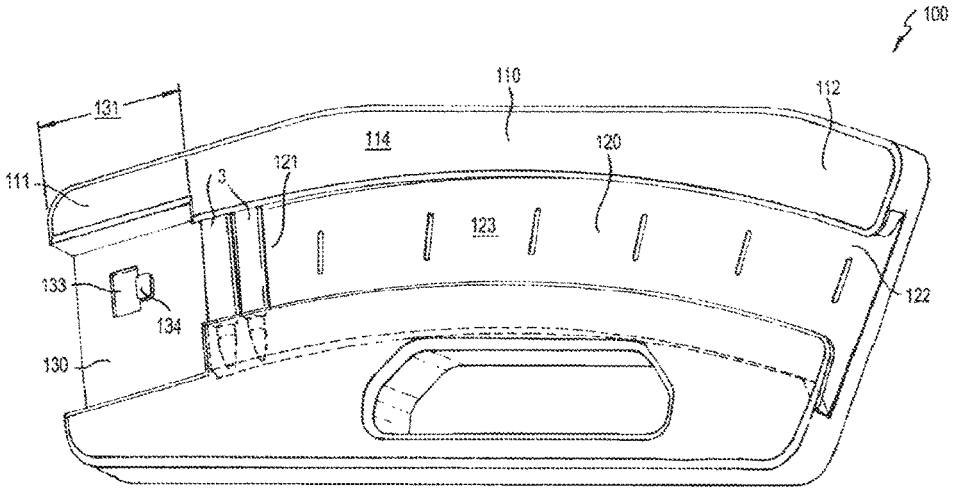
FIG. 1a illustrates an exemplary ammunition magazine loader according to the present invention, in which a loader includes a main body, a rounds cavity, and a magazine cavity.

It should be noted that this disclosure includes a plurality of embodiments, with a plurality of elements and aspects, and such elements and aspects need not necessarily be interpreted as being conjunctively required by one or more embodiments of the present invention. Rather, all combinations of the one or more elements and/or aspects can enable a separate embodiment of the present invention, which may be claimed with particularity in this or any one or more future filed Non-Provisional Patent Applications. Moreover, any particular materials, structures, and/or sizes disclosed herein, whether expressly or implicitly, are to be construed strictly as illustrative and enabling, and not necessarily limiting. Therefore, it is expressly set forth that such materials, structures, and/or sizes independently or in any combination thereof, are merely illustratively representative of one or more embodiments of the present invention and are not to be construed as necessary in a strict sense.

Further, to the extent the same element or aspect is defined differently within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

According to the present invention, a magazine loader can be formed from any one or more materials or combinations of materials, such as one or more of plastic, rubber, wood, metal, a crystalline material, or any other man-made or naturally occurring material, for example and not in limitation, insofar as the same if functionally consistent with the invention as described. Further, a loader can be manufactured in any one or more functionally compatible manners, such as through molding, machining, etc.

Notably, the present invention includes particular structural aspects described herein that allow for particular pivoting of rounds for subsequent loading into a magazine, such as a single feed magazine, for example and not in limitation.

FIGS. 1a-2b illustrate exemplary embodiments of a magazine loader 100, which can be configured to load a plurality of ammunition rounds 3 into a magazine 1 having a magazine shape, such as a straight or curved parallelepiped for example and not in limitation, and a magazine length 2.

In an exemplary aspect, a round 3, which includes a case and projectile, can include a first round end 4 and a second round end 5. Notably, a round 3 can be a live or blank round.

Figure 1B:
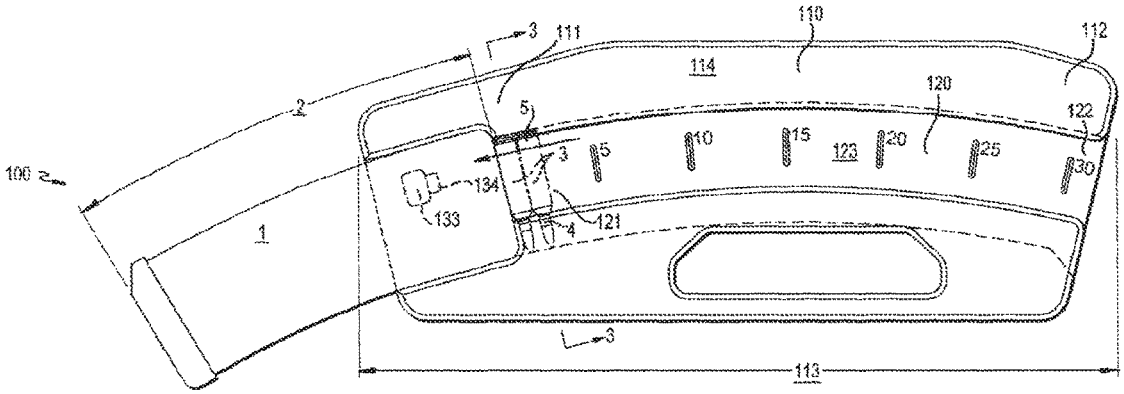
FIG. 1b illustrates such an exemplary ammunition magazine loader with an exemplary magazine positioned within the magazine cavity.
Figure 2A:
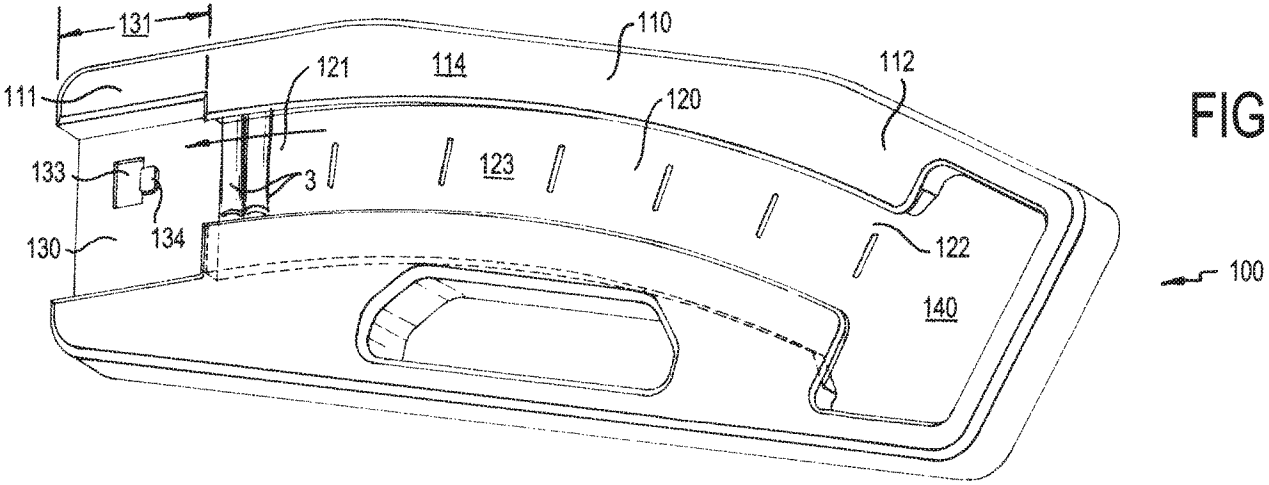
FIG. 2a illustrates an exemplary ammunition magazine loader according to the present invention, in which a loader includes a main body, a rounds cavity, a magazine cavity, and an optional rounds retention cavity.
Figure 2B:
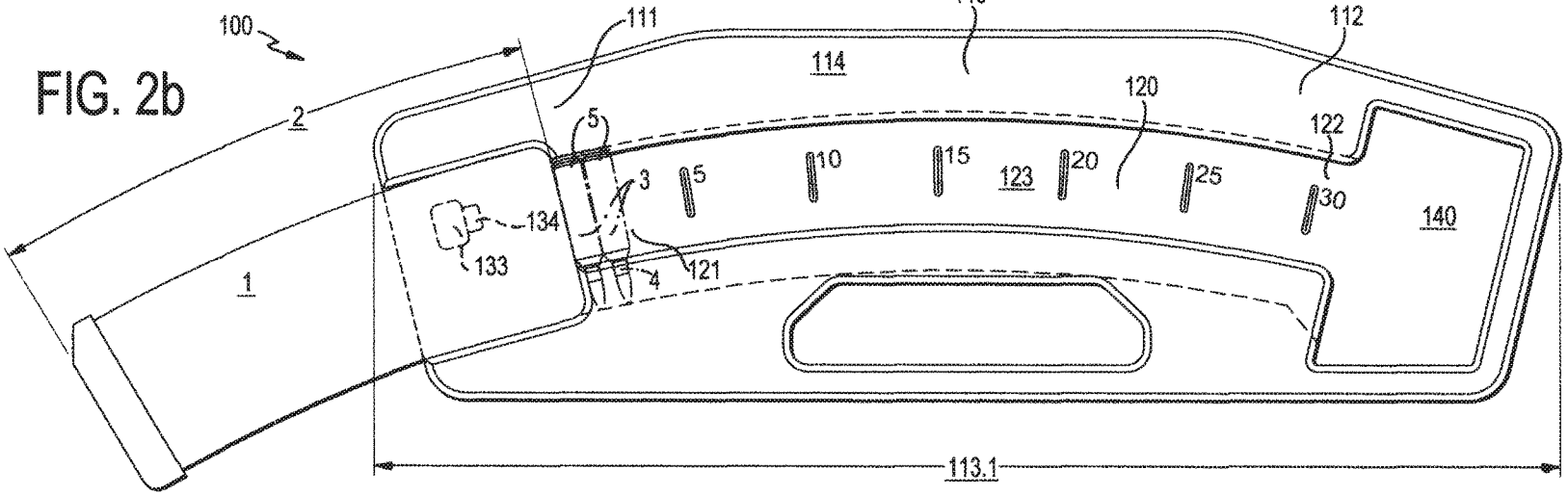
FIG. 2b illustrates such an exemplary ammunition magazine loader having an optional rounds retention cavity, and with an exemplary magazine positioned within the magazine cavity.

FIGS. 1a and 1b illustrate an exemplary loader 100 having a main body 110, a rounds cavity 120, and a magazine cavity 130; whilst FIGS. 2a and 2b illustrate another exemplary embodiment, in which loader 100 can further include an optional rounds retention cavity 140.

As illustratively shown in FIGS. 1a-2b, main body 110 can include a first main body end 111, a second main body end 112, and a main body length 113.

As further illustratively shown, rounds cavity 120 can be formed within main body 110, can extend along main body length 113, and can include a first rounds cavity end 121, a second rounds cavity end 122, at least one lower rounds cavity abutment 123 (such as, for example and not in limitation, the element of a rounds cavity bottom 123), a first rounds cavity side 124, a second rounds cavity side 125, and at least one upper rounds cavity abutment 126 [or 127] (such as, for example and not in limitation, the elements of a first rounds cavity ledge 126 and/or a second rounds cavity ledge 127).

As illustrated in FIG. 2a-2b, in another exemplary aspect, rounds cavity 120 can be complementarily shaped to rounds 3 to allow the rounds to slidably move within at least a portion of the rounds cavity and to exit through first rounds cavity end 122. Notably, rounds cavity 120 can be structurally configured such that rounds 3 can be introduced into the rounds cavity via at least one of first rounds cavity end 121, second rounds cavity end 122, and a portion therebetween, all of which are deemed equivalents. Further notably, rounds cavity 120 can be provided with any functionally compatible shape, and accordingly, for example and not in limitation, any bottom or side described herein can include any combination of one or more linear and/or curvilinear shapes, including but not limited to, any contiguously positioned side, sides, and/or bottom being similarly, dissimilarly, or identically curvilinear.

Figure 3A:
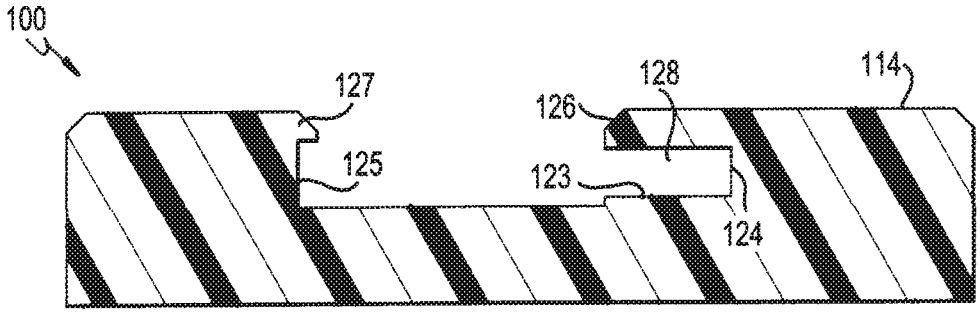
FIG. 3a illustrates a cross-section view of an exemplary rounds cavity.
Figure 3B:
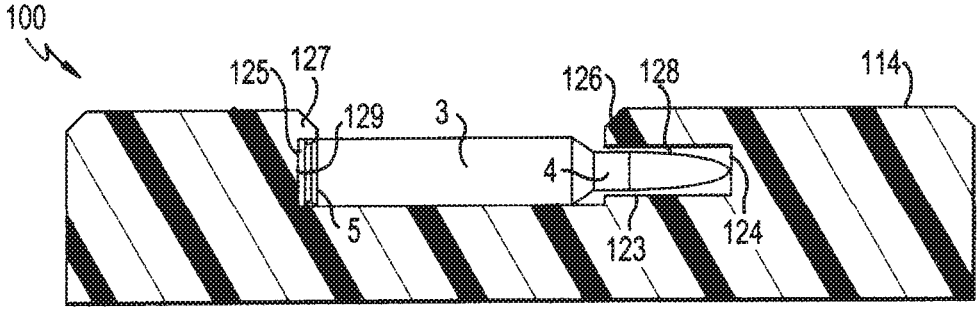
FIG. 3b illustrates a cross-section view of an exemplary rounds cavity having a live round positioned therein.
Figure 3C:
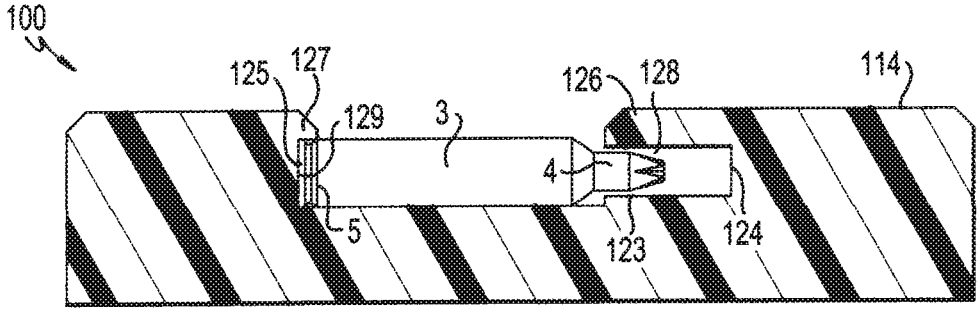
FIG. 3c illustrates an exemplary rounds cavity having a blank round positioned therein.
Figure 4:
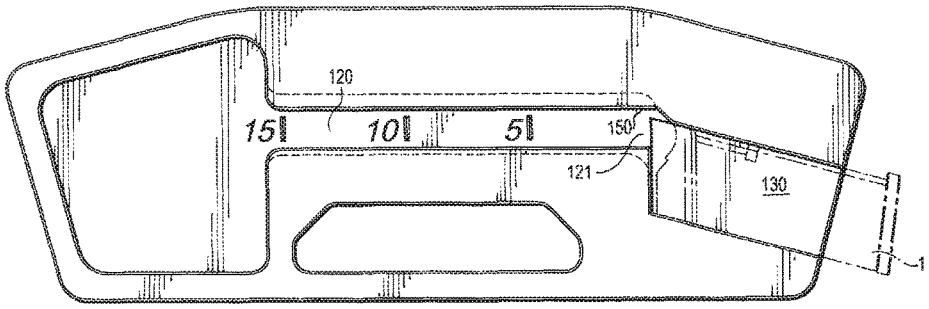
FIG. 4 illustrates an exemplary loader having a rounds abutment.

Referring now to FIGS. 3a-3c, lower rounds cavity abutment 123, first and second rounds cavity sides 124, 125, and the at least one upper rounds cavity abutment 126 can be positioned to abuttingly limit movement of rounds 3 along a movement plane $P_M$ (shown in FIG. 7e) when the rounds exit rounds cavity 120 and into magazine cavity 130, and functional loading of magazine 1 can be effectuated.

As illustrated in FIGS. 3b and 3c, in a particular exemplary embodiment of the present invention, with rounds 3 held within rounds cavity 120, each first round end 4 can be positioned within a first rounds cavity 128 and under at least one upper rounds cavity abutment 126 and/or 127 and each second round end 5 can be positioned within a second rounds cavity 129 and also under at least one upper rounds cavity abutment 126 and/or 127.

As illustrated in FIG. 1a-2b, loader 100 further includes a magazine cavity 130 that can be positioned at first main body end 111. As shown, magazine cavity 130 includes a magazine cavity length 131 that can be less than magazine length 2. Accordingly, in an exemplary aspect, the present invention is not limited to a maximum-length magazine, which can arise when a magazine cavity is configured to encapsulate the entire length of a magazine, which can optionally be provided to the extent desired. Further, in another exemplary aspect, due to the length consideration above, main body length 113 can be reduced, as the main body length would not require inclusion of the full length of a magazine, rendering the overall length of the invention less and therefore more conveniently transportable and/or storable.

As further illustrated, magazine cavity 130 can be complementarily shaped to the shape of magazine 1 so as to facilitate retention of the magazine in a fixed position within the magazine cavity during loading. Accordingly, retention can be effectuated via a friction fit between magazine 1 and a portion of main body 110 that defines magazine cavity 130. Further, alternatively or in combination, retention can be facilitated with at least one of a magazine retention depression 133 and a magazine retention protrusion 134, which can retentionally engage a compatibly configured portion of magazine 1, such as a notch, for example and not in limitation.

Figure 7A:
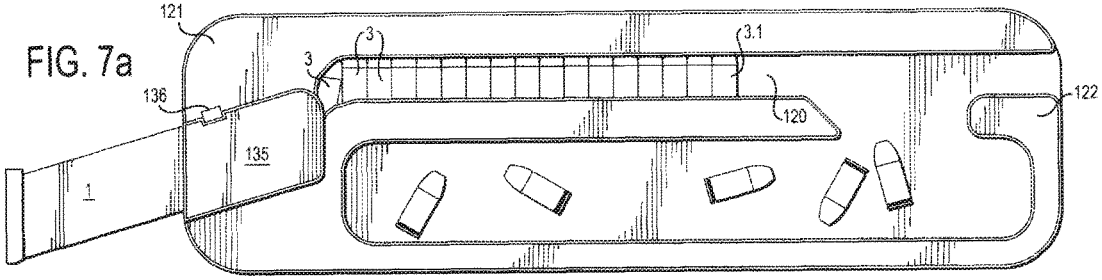
FIG. 7a illustrates an exemplary loader configured for loading a single-feed magazine.
Figure 7B:
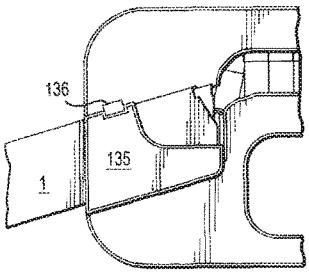
FIG. 7b illustrates an exemplary loader with an exemplary magazine cavity having a magazine retention cover.
Figure 7C:
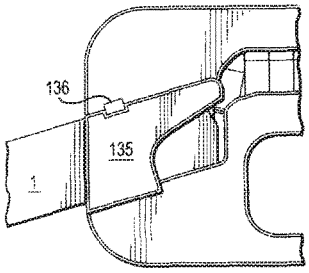
FIG. 7c illustrates an exemplary loader with an exemplary magazine cavity having another exemplary magazine retention cover that covers at least a portion of the magazine cavity and at least a portion of the rounds cavity.
Figure 7D:
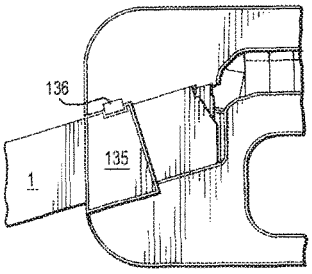
FIG. 7d illustrates an exemplary loader with an exemplary magazine cavity having yet another exemplary magazine retention cover.
Figure 7E:
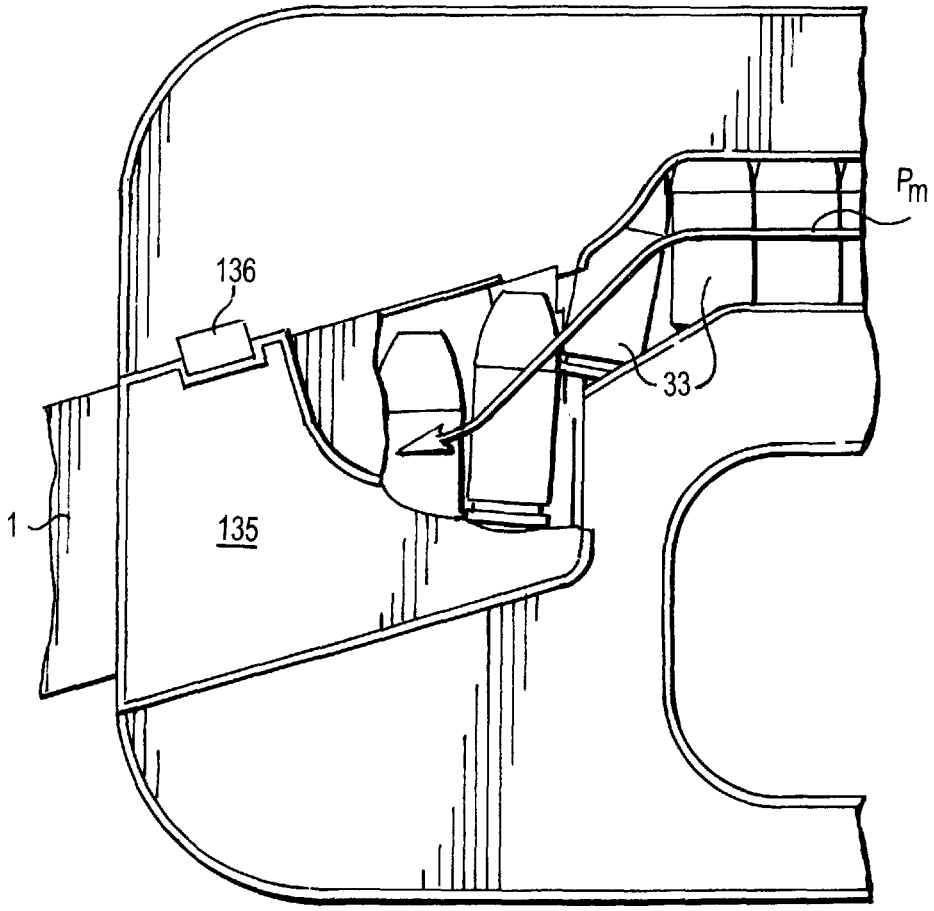
FIG. 7e illustrates an exemplary loader in which an exemplary movement plane is illustrated.

Also illustrated, second rounds cavity end 122 can be positioned at second main body end 112, and optionally, shaped to accept rounds 3 into rounds cavity 120. Accordingly, as first rounds cavity end 121 opens into magazine cavity 130, when magazine 1 is positioned within the magazine cavity, rounds 3 can be slidably moved out of rounds cavity 120 along movement plane $P_M$ (as illustrated in FIG. 7e), through the first rounds cavity end, and into magazine 1. For example and not in limitation, a user can utilize their finger or any other desired structure that fits within at least a portion of rounds cavity 120 to push a last round 3b (see FIGS. 5c-5f) towards magazine 1, such that the last round, and any other rounds between the last round and the first rounds cavity end 121, slidably move out of the rounds cavity, through the first rounds cavity end, and into the magazine.

In another exemplary aspect, FIGS. 7a-7d and 8 illustrate additional exemplary embodiments of the present invention that can accommodate the loading of a single feed magazine. As illustratively shown in FIGS. 7a-7d, as rounds 3 positioned within rounds cavity 120 are moved towards magazine 1, each round can successively pivot, such that each second round end 5 is angled towards the magazine. Notably, FIGS. 7a-7d further illustrate optional magazine cavity cover 135, which can be provided as a separate structure or can be integral with loader 100, and can cover at least a portion of magazine cavity 130 (illustrated in FIGS. 7a-7d) and/or rounds cavity 120 (illustrated in FIG. 7c). Further illustrated, optionally, a magazine retention system, such as those integrated with Glock™ firearms can be provided, along with a magazine release 136.

Figure 5A:
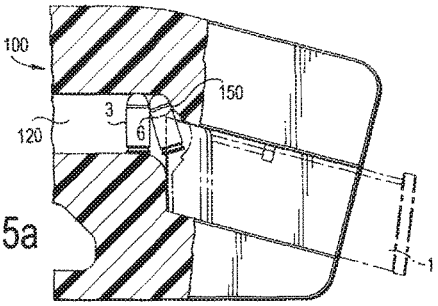
FIG. 5a illustrates an exemplary rounds abutment provided as a portion of an exemplary first rounds cavity side that is curved.
Figure 5B:
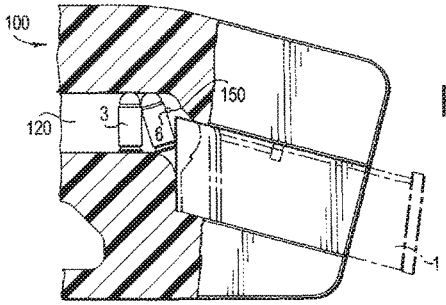
FIG. 5b illustrates an exemplary rounds abutment provided as a post.
Figure 5C:
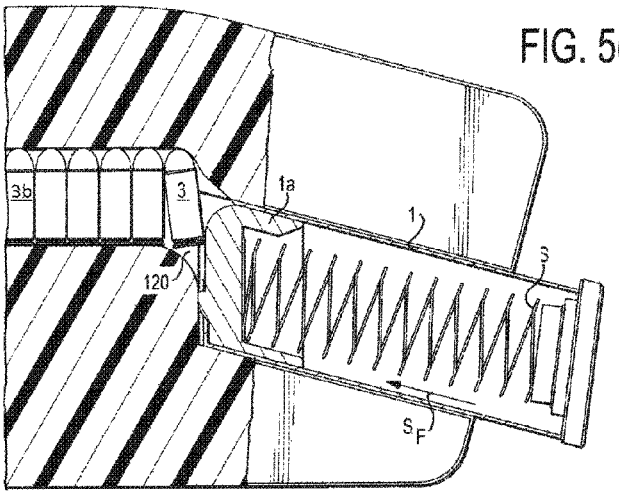
FIG. 5c illustrates an exemplary empty magazine being loaded with a round that abuts and forces a follower downwardly against a spring force as the round enters the magazine.
Figure 5D:
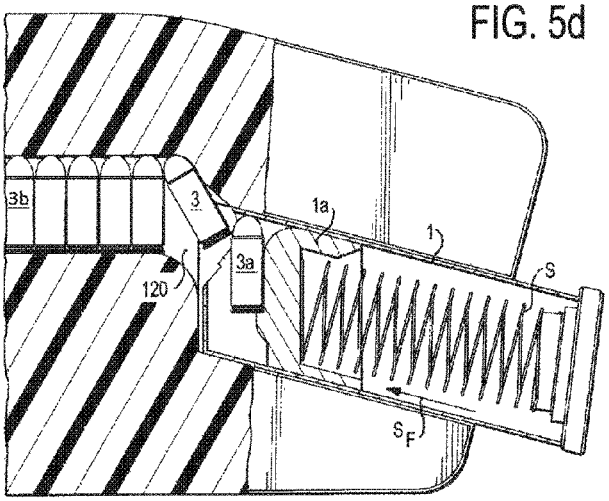
FIG. 5d illustrates an exemplary magazine having a pre-loaded round being loaded with another round that abuts and forces the pre-loaded round and a follower downwardly against a spring force as the other round enters the magazine.
Figure 5E:
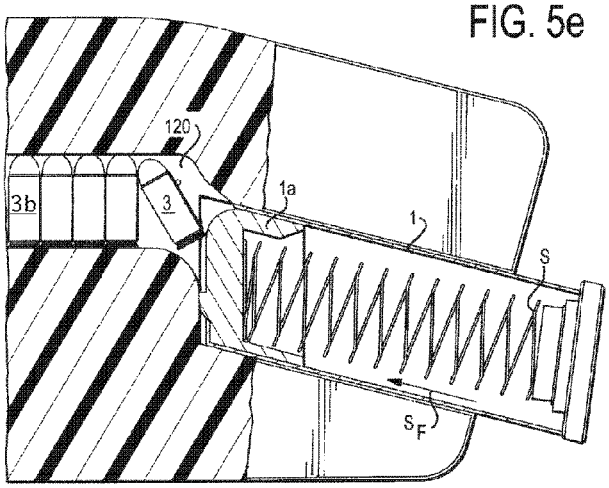
FIG. 5e illustrates an exemplary empty magazine being loaded with a round that abuts and forces a follower downwardly against a spring force as the round enters the magazine.
Figure 5F:
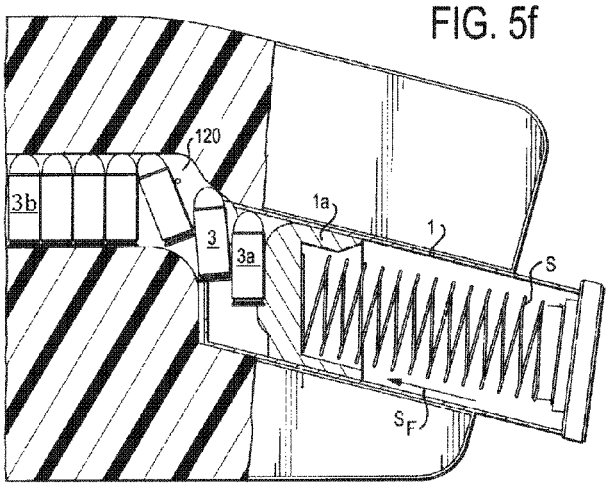
FIG. 5f illustrates an exemplary magazine having a pre-loaded round being loaded with another round that abuts and forces the pre-loaded round and a follower downwardly against a spring force as the other round enters the magazine.
Figure 6:
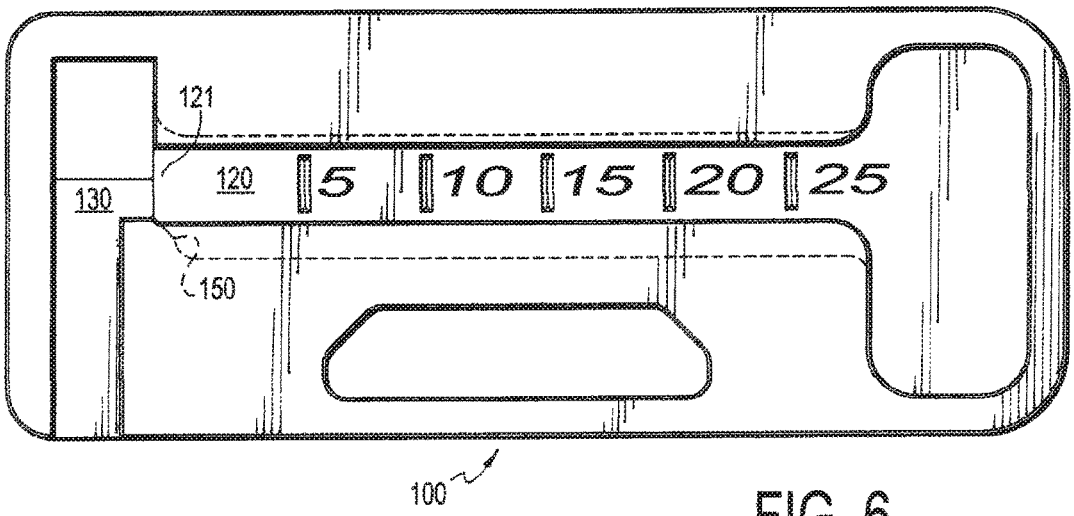
FIG. 6 illustrates an exemplary loader configured for loading an exemplary magazine.
Figure 6A:
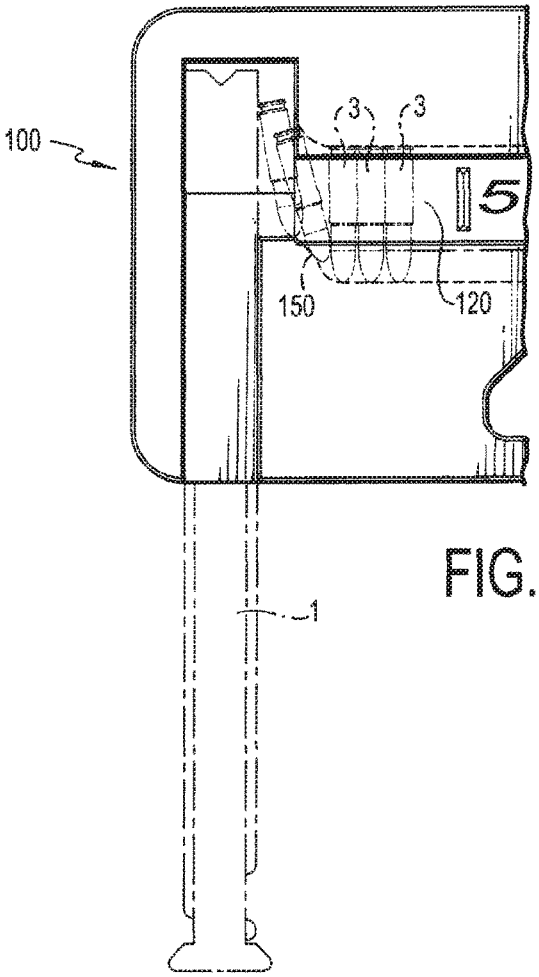
FIG. 6a illustrates an exemplary loader with exemplary rounds pivoting about a portion of an exemplary first rounds cavity side that is curved.

FIGS. 5a and 5b illustratively show loader 100 being configured to load a common single feed magazine, which can be, for example and not in limitation, a GLOCK™ compatible magazine; whilst FIGS. 6 and 6a illustratively show a loader being configured to load a P90™ magazine.

As illustrated in FIGS. 5c-5f, when an exiting round 3 exits rounds cavity 120, the exiting round abuts and forces at least one of a follower 1a and a pre-loaded round 3a in magazine 1 downwardly into the magazine against a spring force $S_F$ provided by spring S as the exiting round enters the magazine.

Figure 8:
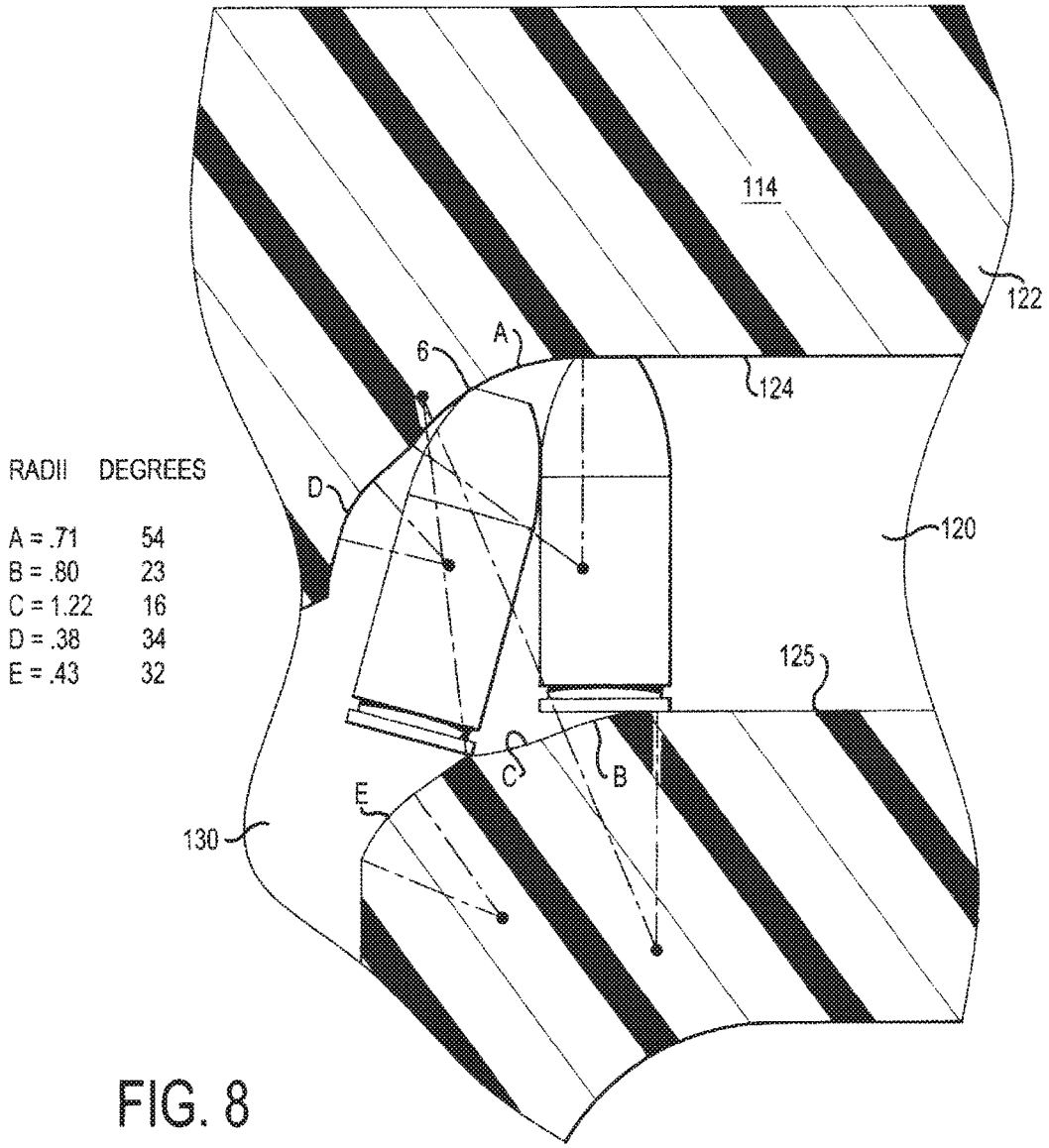
FIG. 8 illustrates exemplary first and second rounds cavity sides having exemplary downwardly angled portions.
Figure 9:
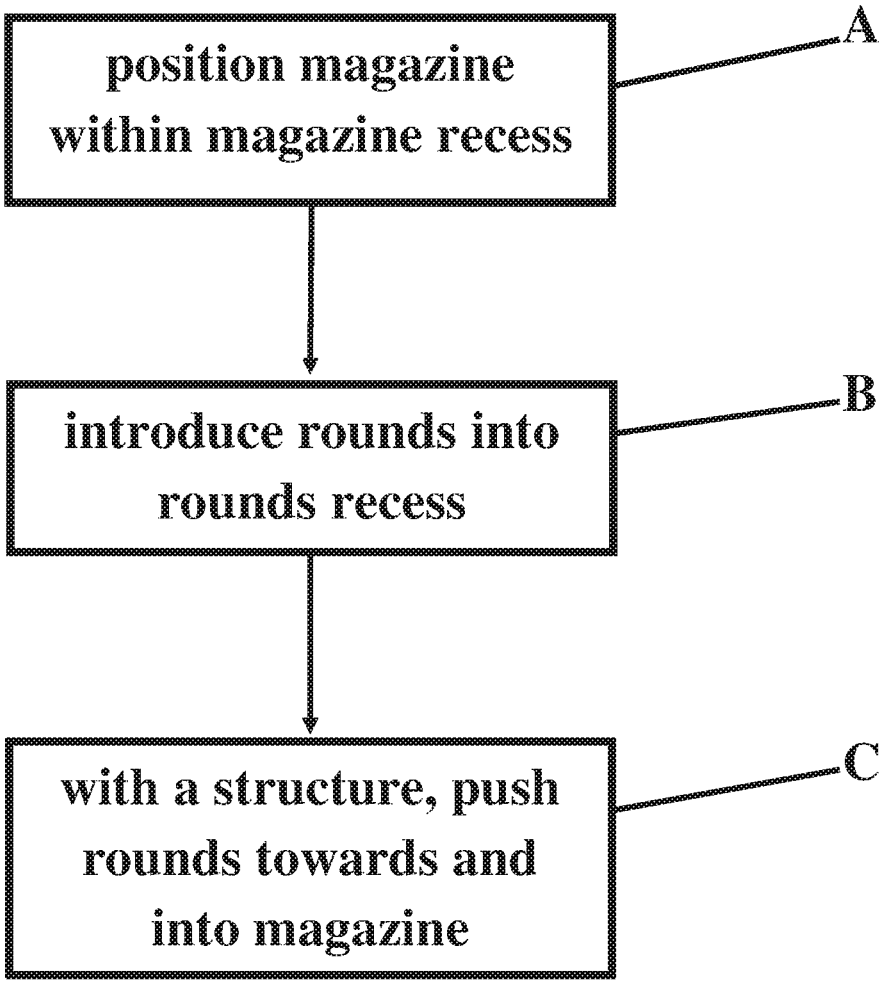
FIG. 9 illustrates exemplary method steps of loading an ammunition magazine with a magazine loader.

FIG. 8 illustrates an exemplary rounds cavity 120 having first and second rounds cavity sides 124, 125 that include downwardly angled portions A-E, which can effectuate such pivoting of rounds 3. In an exemplary aspect, a loader 100 can be provided with any combination of angled portions A-E. Notably, the language "downwardly angled" is intended to represent any angle of first rounds cavity side 124 that is angled towards second rounds cavity side 125, and any angle of the second rounds cavity side that is angled away from the first rounds cavity side. Further notably, any angled portion described herein can be provided with a concave, linear, convex, or irregular shape.

In another exemplary aspect, first rounds cavity side 124 can be provided with a downwardly angled portion A positioned between magazine cavity 130 and second main body end 122, and second rounds cavity side 125 can be provided with another downwardly angled portion E that opens into magazine cavity 130. Accordingly, as rounds 3 are moved towards magazine 1, a pivot point 6 of each round can contact the downwardly angled portion A to pivot the second round end 5 of the round towards the magazine and over the other downwardly angled portion E, before the round subsequently enters the magazine.

As illustrated in FIG. 8, in optional exemplary aspects, downwardly angled portion A can be provided with a convex shape and/or downwardly angled portion E can be provided with a concave shape. In further optional exemplary aspects, downwardly angled portion A can include an about 0.43 inch radius and/or downwardly angled portion E can include an about 0.71 inch radius.

As further illustrated in FIG. 8, in yet additional optional exemplary aspects, second rounds cavity side 125 can further include one or two additional downwardly angled portions B, C positioned between downwardly angled portion E and second main body end 122. Notably, where downwardly angled portion B is optionally provided, the portion B can optionally include a convex shape, and even further optionally, can include an about 0.80 inch radius. Further notably, where downwardly angled portion C is optionally provided, the portion C can optionally include a concave share, and even further optionally, can include an about 1.22 inch radius.

As still further illustrated in FIG. 8, in a further optional exemplary aspect, first rounds cavity side 124 can further include another downwardly angled portion D positioned between portion A and magazine cavity 130. Notably, where downwardly angled portion D is optionally provided, the portion D can optionally include a concave shape, and even further optionally, can include an about 0.43 inch radius.

Notably, while the present invention contemplates the provisioning of any combination of portions A-E, with various positions, shapes, and/or radii, it is merely illustrative that the combination of A and E provide a particular combination having functional utility. Further, optional and illustrative shapes, positioning, and radii of portions A-E have been described, and it is expressly set forth that such shapes, positions, and radii, are to be construed as illustrative and enabling teachings, with reasonable deviations being expressly contemplated, and are expressly to be construed as being within the spirit and scope of the present invention. Moreover, such portions A-E, including their respective positioning, shapes, and/or radii, are provided as teachings for advantageous use with geometric dimensions of 9×19 mm Parabellum (as well as 357 SIG, 45ACP, 10 mm, and 40 caliber rounds); however, such portions, including their respective shapes, positioning, and/or radii are to be further construed as teachings to accommodate other sized rounds. In particular, any selection, shaping, positioning, and/or radii of such portions can be determined for alternatively shaped rounds based on how the illustrative embodiments and aspects herein physically manipulate 9×19 mm Parabellum rounds. Further, tolerances of the exemplary radii described herein can be up to 0.1 inches, with due consideration to adjacent and cooperating geometries related thereto. Accordingly, the present invention is expressly contemplated to apply to various types of rounds for use with single and double feed magazines types.

Therefore, it will be apparent to one of ordinary skill in the art that the manner of making and using the claimed invention has been adequately disclosed in the above-written description of the exemplary embodiments and aspects.

It should be understood, however, that the invention is not necessarily limited to the specific embodiments, aspects, arrangement, and components shown and described above, but may be susceptible to numerous variations within the scope of the invention. For example, while the present invention is illustratively shown used with a curved magazine, loader 100 can be configured for use with any shaped magazine, including straight, curved, etc. Further, rounds cavity 120 is generally shown to be linear along the main body length 113, however, can be provided with any functionally compatible shape or shapes to the extent desired.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents of the appended claims.

Therefore, I claim:

1. A method of using an ammunition magazine loader to load, with a single motion, a plurality of ammunition rounds into an ammunition magazine having a follower, a spring providing a spring force biasing the follower upwardly, and a magazine shape, with each round respectively including a first case end, a second case end opposite the first case end, and a pivot point, and with the magazine loader comprising a main body, a magazine cavity, formed within the main body, and complementarily shaped to the magazine shape to allow the magazine to fit at least partially within the magazine cavity, a rounds cavity, formed within the main body, and having a particular rounds cavity end in communication with the magazine cavity, the rounds cavity being defined at least in part by first and second rounds cavity sides, at least one upper rounds cavity abutment, and at least one lower rounds cavity abutment, a plurality of the rounds cavity sides, the at least one upper rounds cavity abutment and the at least one lower rounds cavity abutment being configured to define movement of the rounds along at least one movement plane when the rounds are positioned within the rounds cavity, and at least a portion of the rounds cavity being shaped to accept each round into the rounds cavity, and a rounds abutment at least partially positioned, within the rounds cavity, and at the particular rounds cavity end, said method comprising:

a. positioning the magazine within the magazine cavity;

b. introducing the rounds into the rounds cavity; and c. with a structure, pushing the rounds in the single motion, via a last round, towards and into the magazine, such that as the rounds are moved towards the magazine, the pivot point of each round successively contacts the rounds abutment to angle the second case end of each successive round towards the magazine, and when an exiting round exits the rounds cavity, the exiting round abuts and forces at least one of the follower and a pre-loaded round in the magazine into the magazine against the spring force as the exiting round enters the magazine.

2. The method of claim 1, wherein at least one of the rounds cavity sides, the at least one upper rounds cavity abutment, and the at least one lower rounds cavity abutment includes a linear shape.

3. The method of claim 1, wherein the first rounds cavity side includes the rounds abutment.

4. The method of claim 1, wherein the rounds abutment is adjacent to the first rounds cavity side.

5. The method of claim 1, wherein the main body includes a slot exposing a portion of the rounds cavity.

6. The method of claim 1, wherein the at least one lower cavity abutment is a rounds cavity floor.

7. The method of claim 1, wherein the magazine loader further comprises a rounds retention structure in communication with the rounds cavity, the rounds retention structure being structurally configured to abuttingly hold one or more rounds.

8. The method of claim 1, wherein at least a portion the first rounds cavity side includes one of a curvilinear shape and a linear shape that provides the rounds abutment.

9. The method of claim 1, wherein the magazine loader further comprises a magazine cavity cover that covers at least a portion of at least one of the magazine cavity and the rounds cavity.

10. The method of claim 1, wherein the loader further comprises a magazine cavity cover that covers at least a portion of the magazine cavity and the rounds cavity.

11. The method of claim 1, wherein the first rounds cavity side includes a downwardly angled portion that provides the rounds abutment.

12. The method of claim 11, wherein the loader further comprises a magazine cavity cover that covers at least a portion of the magazine cavity and the rounds cavity.

13. The method of claim 11, wherein the downwardly angled portion includes a linear shape.

14. The method of claim 11, wherein the downwardly angled portion includes at least one of a concave shape and a convex shape.

15. The method of claim 11, wherein the magazine loader further comprises a magazine cavity cover that covers at least a portion of at least one of the magazine cavity and the rounds cavity.

16. The method of claim 1, wherein the second rounds cavity side includes a first downwardly angled portion, and the first rounds cavity side includes a second downwardly angled portion that provides the rounds abutment, and in said step of pushing, as the rounds are moved towards the magazine, the second case end of each round successively passes over the first downwardly angled portion.

17. The method of claim 16, wherein the first downwardly angled portion includes at least one of a linear shape and a curvilinear shape.

18. The method of claim 17, wherein the second downwardly angled portion includes at least one of a linear profile and a curvilinear profile.

19. The method of claim 16, wherein the second rounds cavity side includes a third downwardly angled portion.

20. A method of using an ammunition magazine loader to load, with a single motion, a plurality of ammunition rounds into an ammunition magazine having a follower, a spring providing a spring force biasing the follower upwardly, and a magazine shape, with each round respectively including a first case end, a second case end opposite the first case end, and a pivot point, and with the magazine loader comprising a main body, a magazine cavity, formed within the main body, and complementarily shaped to the magazine shape to allow the magazine to fit at least partially within the magazine cavity, a rounds cavity, formed within the main body, and having a particular rounds cavity end in communication with the magazine cavity, the rounds cavity being defined by an inner main body surface configured to define movement of the rounds along at least one movement plane when the rounds are positioned within the rounds cavity, and at least a portion of the rounds cavity being shaped to accept each round into the rounds cavity, and a rounds abutment at least partially positioned, within the rounds cavity, and at the particular rounds cavity end, said method comprising:

a. positioning the magazine within the magazine cavity;

b. introducing the rounds into the rounds cavity; and c. with a structure, pushing the rounds in the single motion, via a last round, towards and into the magazine, such that as the rounds are moved towards the magazine, the pivot point of each round successively contacts the rounds abutment to angle the second case end of each successive round towards the magazine, and when an exiting round exits the rounds cavity, the exiting round abuts and forces at least one of the follower and a pre-loaded round in the magazine into the magazine against the spring force as the exiting round enters the magazine.

21. The method of claim 20, wherein the inner main body surface includes the rounds abutment.

22. The method of claim 20, wherein the inner main body surface includes at least one of a linear shape and a curvilinear shape.

23. The method of claim 20, wherein the main body includes a slot exposing a portion of the rounds cavity.

24. The method of claim 20, wherein the magazine loader further comprises a rounds retention structure in communication with the rounds cavity, the rounds retention structure being structurally configured to abuttingly hold one or more rounds.

25. The method of claim 20, wherein the magazine loader further comprises a magazine cavity cover that covers at least a portion of at least one of the magazine cavity and the rounds cavity.

26. The method of claim 20, wherein the magazine loader further comprises a magazine cavity cover that covers at least a portion of the magazine cavity and the rounds cavity.

27. The method of claim 20, wherein the inner main body surface includes a downwardly angled portion that provides the rounds abutment.

28. The method of claim 27, wherein the downwardly angled portion includes a linear shape.

29. The method of claim 27, wherein the downwardly angled portion includes at least one of a concave shape and a convex shape.

30. The method of claim 27, wherein the magazine loader further comprises a magazine cavity cover that covers at least a portion of at least one of the magazine cavity and the rounds cavity.

31. The method of claim 27, wherein the loader further comprises a magazine cavity cover that covers at least a portion of the magazine cavity and the rounds cavity.

32. The method of claim 20, wherein the inner main body surface includes a first downwardly angled portion, and a second downwardly angled portion that provides the rounds abutment, and in said step of pushing, as the plurality of rounds are moved towards the magazine, the second case end of each round successively passes over the first downwardly angled portion.

33. The method of claim 32, wherein the first downwardly angled portion includes at least one of a linear shape and a curvilinear shape.

34. The method of claim 33, wherein the second downwardly angled portion includes at least one of a linear profile and a curvilinear profile.

35. The method of claim 32, wherein the inner main body surface includes a third downwardly angled portion.

36. An ammunition magazine loader configured to load, with a single motion, a plurality of ammunition rounds into a magazine having, a follower, a spring providing a spring force biasing the follower upwardly, and a magazine shape, with each round respectively including first and second case ends and a pivot point, said ammunition magazine loader comprising:

a main body;

a magazine cavity, formed within the main body, and complementarily shaped to the magazine shape to allow the magazine to fit at least partially within said magazine cavity;

a rounds cavity, formed within the main body, and having a particular rounds cavity end in communication with said magazine cavity, said rounds cavity being defined at least in part by first and second rounds cavity sides, at least one upper cavity abutment, and at least one lower cavity abutment, a plurality of the rounds cavity sides, the at least one upper cavity abutment, and the at least one lower cavity abutment being configured to define movement of the rounds along at least one movement plane when the rounds are positioned within said rounds cavity, and at least a portion of said rounds cavity being shaped to accept each round into said rounds cavity; and a rounds abutment at least partially positioned, within the rounds cavity, and at the particular rounds cavity end;

wherein with the magazine positioned within said magazine cavity and as the plurality of rounds are slidably moved, via the single motion, towards the magazine, the pivot point of each round successively contacts said rounds abutment to angle the second case end of each respective round towards said magazine cavity, and when an exiting round exits said rounds cavity, the exiting round abuts and forces at least one of the follower and a pre-loaded round in the magazine downwardly into the magazine against the spring force as the exiting round enters the magazine.

* * * * *